United States Patent [19]

Laurent

[11] Patent Number: 5,433,865
[45] Date of Patent: Jul. 18, 1995

[54] METHOD FOR TREATING PROCESS WASTE STREAMS BY USE OF NATURAL FLOCCULANTS

[76] Inventor: Edward L. Laurent, 52 Eastfield Rd., Montgomery, Ill. 60538

[21] Appl. No.: 220,781

[22] Filed: Mar. 31, 1994

[51] Int. Cl.6 .................................................. C02F 1/54
[52] U.S. Cl. ................................... 210/727; 210/730; 210/731
[58] Field of Search ............... 210/726, 727, 729, 730, 210/731

[56] References Cited

U.S. PATENT DOCUMENTS

| | | | |
|---|---|---|---|
| 3,165,465 | 1/1965 | Ray et al. | 210/53 |
| 3,259,570 | 7/1966 | Priesing et al. | 210/53 |
| 3,338,828 | 8/1967 | Clark | 210/52 |
| 3,377,274 | 4/1968 | Burke et al. | 210/53 |
| 3,397,139 | 8/1968 | Sak | 210/7 |
| 3,533,940 | 10/1970 | Peniston et al. | 210/52 |
| 3,617,568 | 11/1971 | Reis, Jr. | 210/53 |
| 4,105,558 | 8/1978 | Heinrich et al. | 210/199 |
| 4,382,864 | 5/1983 | Hashimoto et al. | 210/727 |
| 4,479,879 | 10/1984 | Hashimoto et al. | 210/727 |
| 4,565,635 | 1/1986 | Le Du et al. | 210/727 |
| 4,933,087 | 6/1990 | Markham, Jr. et al. | 210/626 |
| 4,966,713 | 10/1990 | Keys et al. | 210/705 |
| 5,204,007 | 4/1993 | Mosley et al. | 210/705 |
| 5,221,790 | 6/1993 | Besnard et al. | 210/729 |
| 5,266,201 | 11/1993 | Letourneux et al. | 210/620 |
| 5,269,939 | 12/1993 | Laurent et al. | 210/705 |
| 5,286,386 | 2/1994 | Darian et al. | 210/639 |

*Primary Examiner*—Neil McCarthy
*Attorney, Agent, or Firm*—Marshall, O'Toole, Gerstein, Murray & Borun

[57] ABSTRACT

A method for treating cattle, fish, and poultry processing waste streams by the sequential addition of natural flocculants wherein at least one of the natural flocculants is liquid chitosan and another of the natural flocculants is an anionic natural flocculant.

20 Claims, No Drawings

METHOD FOR TREATING PROCESS WASTE STREAMS BY USE OF NATURAL FLOCCULANTS

BACKGROUND OF THE INVENTION

1. Field of the Invention

This invention relates generally to a method for treating process waste streams and, more particularly, the invention is directed to the treatment of cattle, fish, and poultry process waste streams by the sequential addition of natural flocculants.

2. Description of Related Technology

Conventional methods for treating process waste streams by flocculation typically require the use of one or more high molecular weight synthetic flocculants. The resultant flocculent mass is recovered by mechanical dewatering methods such as vacuum filtration, centrifugation, press filtration, or flotation. The desired goal of the prior flocculation methods is to obtain large, rigid floc with low moisture content which will result in excellent dewatering performance.

More specifically, one approach has been a two-stage flocculation method in which a first high molecular weight synthetic flocculant of an ionic charge opposite to that of the waste stream being treated is added to the waste stream to neutralize the ionic charge thereof. A second high molecular weight synthetic flocculant of an ionic charge opposite to that of the first flocculant is next added to the system to form giant stout floc. Recovery is effected by conventional dewatering methods.

In a second approach a polymeric synthetic flocculant of an ionic charge opposite to that of the waste stream being treated is added to the stream in an amount sufficient to barely reverse the ionic charge or zeta-potential of the waste stream to a point where numerous small floc are present. A second polymeric synthetic flocculant of an ionic charge opposite to that of the first flocculant is then added in an amount sufficient to again reverse the zeta-potential of the system and to form large floc of a minimum diameter of at least 0.1 mm. See U.S. Pat. No. 3,617,568.

The conventionally used flocculants in these prior methods are synthetic flocculants because they produce strongly bonded floc which are relatively large and rigid and are, therefore, desirable for the subsequent mechanical dewatering operation. The most commonly used synthetic flocculants are polyacrylamides and their derivatives. Polyacrylamides are preferred for use as at least one of the flocculants in the prior processes because their chemical structure contains many double bonds which will result in relatively strong, rigid floc formation.

Attempts have been made to use natural flocculants as part of prior flocculation methods. One method includes the step of adding, in a first stage, a first high molecular weight flocculant with agitation to neutralize (rather than reverse) the ionic charge of the waste stream being treated. However, the first stage agitation intensity must be greater than that ordinarily employed for obtaining flocculation so as to form small size floc no greater than 2 mm in diameter, or to form no floc at all. A second high molecular weight flocculant of a polarity (ionic charge) opposite to the first flocculant is next added with milder agitation until large, rigid, non-sticky flocs are formed. One of the flocculants can be a natural high molecular weight flocculant while the other flocculant is typically a high molecular weight synthetic flocculant, preferably a polyacrylamide or a derivative. The resulting floc is then subjected to a dewatering operation. An important aspect of this process is the neutralization of the waste stream to obtain flocs less than 2 mm in size after the first flocculant is added under high speed agitation and then to add a second flocculant under milder agitation conditions to form flocs larger than those formed after the addition of the first flocculant.

Alginate and other crude algal compositions have been shown to be effective natural flocculants for some waste waters when used alone. The drawbacks to using alginates is that they form weak chemical bonds with the components in the waste stream and pH adjustments to the waste stream are necessary. Moreover, complete flocculation of the suspended solids, particularly those containing blood, is not consistently obtained because the process is pH sensitive.

Shortcomings of these prior processes include difficulty in treating a waste stream containing fatty acids, proteins, grease, or oils, such as are found in most animal and food process waste streams, without using at least one synthetic flocculant, because the floc which is formed in these waste streams can be sticky and/or weakly bonded. It is believed that because natural flocculants contain fewer double bonds than high molecular weight synthetic flocculants, weaker or less bonding with the suspended solids will occur. Consequently, insufficient conditioning will result in little or no floc formation or weakly bonded floc making subsequent recovery difficult. Merely adding a first flocculant of a charge opposite to that of the waste stream being treated to reverse or neutralize the ionic charge or zeta potential of the waste stream and next adding a second flocculant with an ionic charge opposite to the first flocculant will not necessarily provide the desired flocculation when using all natural flocculants. Thus, in the prior methods whenever a natural flocculant is used, an additional high molecular weight synthetic flocculant is also selected in order to acquire the desired flocculent mass for subsequent recovery.

A major drawback to using synthetic flocculants, especially the widely used polyacrylamides or derivatives, is that they can be highly toxic to the environment. As of this date, the Food and Drug Administration (FDA) has refused to approve food additive petitions for the use of polyacrylamides in the treatment of food and poultry processing plant waste streams with the recycling of the captured food solids, fats and greases to animal feed. Consequently, there are increasing concerns regarding the use and disposal of polyacrylamides by the EPA. Additionally, restrictions may be placed on industrial process and sewage wastewaters that are being discharged into municipal sewage systems and sanitary districts and fines may be imposed against the producers of industrial waste exceeding these limits. National Pollution Discharge Elimination System (NPDES) discharge permits place limits on fats, oils and greases (FOG), biological oxygen demand (BOD), chemical oxygen demand (COD), and suspended solids (SS) found in these waste streams.

Moreover, the polyacrylamides and derivatives typically used in treating process waste streams are derived from hydrocarbon monomer polymerization of acrylamide and acrylic acid to create long molecular weight chain polymers. These polymers are present in the end-product made from the prior processes and may contain free (re: unpolymerized) acrylamide that is known to be highly toxic, carcinogenic, and not biodegradable. Studies obtained from independent laboratory testing conducted by expert scientific researchers indicate that these synthetic polymers and associated non-polymerized monomers show positive potential health risks to animals and man when used in animal feed or feed supplements. Thus, the uses for the recovered end-product from these prior processes can be highly restrictive and disposal is limited and expensive. As a result, there is a growing need for a safe and effective flocculation method for treating process waste streams that does not contaminate the environment but will provide for a safe use for the recovered end-product.

SUMMARY OF THE INVENTION

It is an object of the invention to overcome one or more of the problems described above.

According to the invention, a method for treating process waste streams with natural flocculants under normal agitation conditions is provided wherein at least one of the natural flocculants is cationic liquid chitosan and another of the natural flocculants is an artionic natural flocculant. Specifically, when the waste stream is a cattle processing waste stream the anionic natural flocculant is xanthan gum followed by the addition of liquid chitosan. When the waste stream is a fish processing waste stream the first natural flocculant is bentonite, and the second natural flocculant is liquid chitosan, followed by the addition of an alginate as a third natural anionic flocculant. Poultry processing waste streams possessing a net positive ionic charge can be treated by adding an alginate as the first natural artionic flocculant and liquid chitosan as the second natural flocculant. On the other hand, if the poultry processing waste stream possesses a net negative ionic charge, then liquid chitosan is used first followed by an alginate. An amphoteric ionic charged poultry waste stream can be treated by the sequential addition of bentonite as the first natural flocculant, followed by the addition of liquid chitosan as the second natural flocculant and then adding an alginate as the third natural anionic flocculant.

Other objects and advantages of the invention will be apparent to those skilled in the art from a review of the following detailed description and the appended claims.

DETAILED DESCRIPTION OF THE INVENTION

According to the invention, a process waste stream, particularly one containing fatty acids, proteins, grease, or oil, can be treated with all natural flocculants and the by-product recovered flocculent material, sometimes called sludge or biomass, can be safely utilized as an animal feed supplement, fertilizer, fuel source or as landfill. More particularly, cattle, fish, and poultry processing waste streams are treated by the sequential addition of at least two natural flocculants wherein one of the natural flocculants is a cationic liquid chitosan and at least another of the natural flocculants is an artionic natural flocculant.

Examples of anionic natural flocculants which can be employed are alginates, such as sodium alginate for example, xanthan gum, guar gum, locust bean gum or negatively charged cellulose. Alginate is a brown algae (species *Phaeophyceae*) and is produced from brown algae by alkaline extraction. Chitosan is a deacetylated derivative of chitin and can be obtained from the shells of crustacea (crabs, lobsters, shrimp, etc.). Chitosan is commercially available from, for example, Water & Oil Technologies, Inc. of Montgomery, Ill. Liquid chitosan can be obtained by dissolving chitosan to a 1% solution using acetic acid, preferably glacial acetic acid. Derivatives of chitosan may also be used.

Processing waste streams typically discharge waste water that contains inorganic and organic solids made up of fatty acids, proteins, grease, or oils in soluble and insoluble form. These waste streams may also include additional sanitary maintenance chemicals used in the daily operation of animal and food processing plants. These fatty acids, protein, grease and oils can form a matrix with the sanitary maintenance chemicals and interfere with the absorbency by natural flocculants, which can cause incomplete or weak binding, resulting in loose or non-rigid floc formation and increased natural flocculant dosages. Because of these problems, selection of the appropriate natural flocculants for use in treating a particular process waste stream depends not only on the ionic charge of the flocculant but also on its chemical structure and the exact sequence of addition.

In the practice of the invention, the first natural flocculant is incorporated into the process waste stream with agitation to uniformly disperse it throughout the stream and to form a substantially homogenous mixture. In many cases, no floc or only minute (pin-size) floc is formed at this stage. The first natural flocculant usually is of an ionic charge opposite to that of the waste stream being treated. More importantly, the chemical structure of the first natural flocculant must be adequate to form sufficient chemical bonds with the suspended solids in the waste stream to fully condition the waste stream before the addition of the next natural flocculant. Conditioning is the process of not only neutralizing the ionic charge, but the formation of a homogenous mixture from at least two prior heterogenous (non-similar) substances, such as a natural polymer and a process waste stream, so that the addition of another natural flocculant will provide liquid-solid separation called flocculation. Charge neutralization alone will not necessarily result in a conditioned homogeneous mixture when using all natural flocculants, especially when the mixture is amphoteric, like in poultry process waste streams.

Conditioning results in the formation of a complex uniform matrix containing the suspended solids, particularly the fatty acids, proteins, grease, oils, and the like contained in the waste stream. This charge neutralization and homogenous structuring create a receptive conditioned matrix, thus allowing the matrix to react with the next natural flocculant to form a flocculent mass and achieve high water clarity. Adjustment of the pH or monitoring of the ionic charge of the waste stream during this process is not usually required when using sequence addition of natural flocculants. Likewise, the formation of a conditioned homogenous mixture after the addition of the first flocculant is not dependent on floc formation or size.

Where sufficient conditioning is not achieved after the addition of the first natural flocculant, an additional natural flocculant of the same ionic charge as the first natural flocculant can be added with mixing to further condition the waste stream. Incomplete conditioning occurs when a homogenous mixture is not formed which can lead to overdosing of the natural flocculant and poor results.

After the waste stream is fully conditioned and a homogenous mixture is formed, a natural flocculant of an ionic charge opposite to the first natural flocculant is added to the mixture while agitating sufficiently to form a flocculent mass of a size and density to allow for recovery by any of various flotation or other dewatering methods.

Chemical structure and exact sequence of addition of each natural flocculant are critical parameters that must be taken into account in obtaining successful liquid-solid separation of waste water by natural flocculation. Each specific process waste stream will have its own unique natural flocculant regimen.

Agitation employed in the process of the invention can be of the intensity employed by conventional flocculation methods used for process waste streams, and can be the same at each flocculation stage. Again, it is important to completely mix the waste stream after the addition of each natural flocculant before the next natural flocculant is added. However, no pH adjustments are required. The floc formed after the addition of the natural flocculants need not be of any particular size so long as the filtrate water is sufficiently clear and the degree of recovery of suspended solids or rate of capture (removal) is high. The process of the invention may provide about 95–100% removal of total suspended solids and a water filtrate discharge that may range from a tint of coloration to clear water clarity.

The natural flocculants according to the invention will normally be applied in relatively dilute solution ranging from about 0.1% to 1% active solution strength. The dosages of the natural flocculants used may also vary according to the properties present in the waste stream particularly because of the inconsistency of the content of suspended solids, impurities present, electrical conductivity, and changes in the chemical sanitary cleaners, at times, incorporated into the waste stream on any given day. However, because of these variations in compositions, the waste stream should be analyzed daily to assure that correct amounts of the natural flocculants are being added to obtain maximum removal efficiency.

The following procedure can be used for selecting the natural flocculant and for determining the appropriate daily dosage:

Representative water samples are collected from the process waste stream in the area where the flocculation method will be carried out. Typically, the waste water is collected at a representative site prior to further mechanical treatment. 500 ml of the raw process waste water is added to a series of 4–6 laboratory beakers. The first natural flocculant is added starting in the amounts of 1 ppm (parts per million) increasing the dosage by 1 ppm increments for each consecutive beaker, always leaving one beaker as a control for treatment comparison. The beakers are mixed for a time to approximate the speed (rpm) which best simulates the actual flow rate and mixing at the particular processing plant being treated. This procedure attempts to duplicate the mechanical contact time of the process waste stream at the plant with the added natural flocculant (knowing gallons per day of treatment and hours per day of processing) to allow simulation of process time to be duplicated in mixing action of waste with flocculation laboratory testing. Each beaker is then observed after 10 seconds to determine if a homogenous mixture is formed at each respective concentration. If no homogenous mixture is obtained, the beakers are mixed further until a homogenous mixture showing a conditioning effect is formed or up to two minutes. If no homogenous mixture is formed after two minutes, the series is repeated at increasing natural flocculant dosage levels until a conditioned homogenous mixture is formed. The best natural flocculant providing a conditioned homogenous mixture is carried forward for testing with the second natural flocculant.

A series of 4–6 beakers are next prepared containing 500 ml of the conditioned homogenous mixture made up of the first natural flocculant dosage level selected above. The next natural flocculant is then added to each of the beakers in the amounts of 1 ppm, increasing the dosage by 1 ppm for each consecutive beaker, again leaving one beaker as a control. Each beaker is then mixed at the same speed as employed previously for 10–20 seconds or as close to actual process waste treatment that can be duplicated. The beakers are observed to determine which dosage level of that flocculant obtains the desired flocculent mass and highest water clarity. If no flocculation occurs after 20 seconds, the beaker is mixed up to two minutes. Again, if no flocculation occurs after two minutes, the procedure is repeated with the same natural flocculant at increasing dosages until acceptable floc formation and water clarity is obtained. Usually, the resultant dosage used will depend on the water quality desired. The higher the water clarity, the higher the degree of recovery of suspended solids. However, many process operations only desire water quality at sufficient levels for their operation to meet their specific minimum NPDES discharge permit requirements and dosage amounts may be adjusted accordingly.

The daily dosage required in pounds per day for each flocculant can then be calculated by multiplying the flow rate (million gallons per day or mgd) by the weight of water constant (8.34 lbs./gal.) and the dosage selected for each flocculant (ppm or mg/L) which will equal the number of pounds per day of natural flocculant required. For example, (flow, mgd)×(8.34 lbs./gal.)×(mg/L)=lbs./day. This number is then converted to milliliters or gallons per day in order to set the pumps at the process plant and to feed the proper dosage of each flocculant at the correct rate during operating hours. Ideally, this procedure should be followed at the beginning of each day because the contents of the process waste stream will vary depending on the various factors identified above. In addition, surging can occur at the process plant because hourly flow rates vary and are usually not constant.

A specific flocculation regime of sequentially added natural flocculants can be developed for individually treating cattle, fish, and poultry processing waste streams. In particular, cattle processing waste streams, which typically maintain a positive ionic charge, can be treated by the specific sequential addition of anionic xantham gum as the first natural flocculant. The xantham gum is added to the cattle waste stream in an effective amount during agitation to form a conditioned homogenous mixture. The homogenous mixture will form after about 5–10 seconds depending on conditioning mixing action and will contain weakly bonded and loosely formed flocced material that lacks clarity.

It is preferred that the xantham gum contain crushed limestone for the most effective conditioning of the cattle waste stream. The crushed limestone aids in water clarification and floc rigidity for easy removal or recovery. The mixture of crushed limestone and xanthan gum contains about 90–95 weight percent xanthan gum and about 5–10 weight percent limestone. When xanthan gum containing crushed limestone is added as the first natural flocculant, the concentration will range from about 20–50 ppm.

Liquid cationic chitosan is next added to the conditioned homogenous mixture while agitating sufficiently to obtain large rigid floc and high water clarity. Huge rigid floc will be formed within about 15–30 seconds after the addition of the liquid chitosan while using only mild agitation conditions. It is highly preferred that the liquid chitosan be of a high viscosity of about 800–2000 cps measured by a Brookfield Viscometer at 30 rpm using a #3 spindle at 1 weight percent solution at 25° C. letting the material to be tested sit for 24 hours prior to running viscosity check in centipoise. It is also preferred that the high viscosity liquid chitosan is added as the second natural flocculant in the concentration range of about 20–80 ppm.

Fish processing waste streams, particularly surimi (artificial crabmeat) processing waste streams, can be effectively treated by adding cationic bentonite to the negatively charged fish processing waste stream as the first natural flocculant during normal agitation. A mixture containing a thickened homogenous mixture showing little or no floc formation is typically formed after about 5–10 seconds. Bentonite can be either sodium bentonite (western bentonite) or calcium bentonite, however bentonite "fused" to chitosan is preferred. Bentonite fused to chitosan, also called fused bentonite, is a composition of chitosan and bentonite. The chitosan enhances the cationic charge of the bentonite allowing better absorption of the fatty acids, proteins, grease, and oil matrix contained in the fish waste stream which, in turn, enhances floc formation and results in better water clarity. Fused bentonite can be obtained by a process in which a mixture of bentonite and chitosan is heated with pressure, at a temperature sufficient to fuse but not cause structural degradation of the chitosan molecule, and then rapidly cooled. It is believed that the amino group on chitosan is replaced with bentonite at the $\beta 1$–$4$ position of the repeating glucose unit of the chitosan. Fused bentonite is commercially available from Water & Oil Technologies, Inc., Montgomery, Ill. under the trade designation of "WOT Poly B." It is preferred that the fused bentonite composition comprise between 98–99 weight percent bentonite and about 1 weight percent chitosan. It is also preferred that the concentration of bentonite or fused bentonite be in the range of about 180–400 ppm.

Because fish processing waste streams contain a high level of fatty acids, proteins, oils, and grease a second cationic natural flocculant, liquid chitosan, is next added during agitation to further condition the waste stream so as to form a homogenous mixture containing small pin-size floc after about 10–20 seconds. It is preferred that the liquid chitosan be of a high viscosity of at least 800 cps measured by a Brookfield Viscometer at 30 rpm using a #3 spindle at 1% solution at 25° C. and its concentration in the waste stream be in the range of about 350–500 ppm.

After sufficient conditioning is obtained, a third natural flocculant, alginate, is sequentially added to the conditioned homogenous mixture during sufficient agitation to allow for the formation of small, firm but tacky floc giving good water clarity, preferably after 10–30 seconds of additional rapid mixing, followed by diffused aeration. It is highly preferred that the alginate is a high viscosity alginate of at least about 800 cps measured by a Brookfield viscometer using a #3 spindle at 1% solution at 25° C. and it is also preferred that the alginate is sodium alginate. The typical concentration range of the alginate or sodium alginate in the waste stream is about 20–40 ppm.

Poultry processing waste streams can either possess a negative, positive, or amphoteric ionic charge because the diet of the chicken (or other fowl) and the presence of sanitary maintenance chemicals can create an alternating or amphoteric waste stream. In instances where the poultry processing waste stream possesses a negative ionic charge, liquid chitosan is added as the first natural flocculant during agitation to form the conditioned homogenous mixture. A loose large floc is typically obtained in about 5–10 seconds after agitation. This is followed by the addition of an alginate with agitation. A rigid and large flocculent mass will form in about 10–30 seconds giving very good water clarity that often contains a red tint to clear coloration after diffused mechanical aeration.

When the poultry processing waste stream has a positive ionic charge, the reverse order of natural flocculants are added, i.e., an alginate followed by liquid chitosan giving similar floc formation and water clarity.

In instances where the poultry processing waste stream possesses an amphoteric (or alternating) ionic charge, cationic bentonite can be added as the first natural flocculant during agitation. A weak loose floc will form in about 10–30 seconds. To further condition the waste stream, a second cationic natural flocculant, liquid chitosan, is added during agitation to form a homogenous mixture with rigid floc. A third natural anionic flocculant, alginate, is added to further flocculate the mixture and to assist in water clarity, which can range from a tan to red coloration to complete clarity.

Sodium alginate is highly preferred for all poultry processing waste streams. It is also preferred that the alginate be of a high viscosity. The term "high viscosity" as applied to the alginate denotes an average of at least about 800 cps and a degree of polymerization of about 600–1000. The typical concentration range for the alginate in poultry process waste streams possessing a positive ionic charge is about 20–80 ppm, while a negative ionic charged poultry waste stream has a typical concentration range of about 20–160 ppm. Amphoteric poultry waste streams will have a concentration range of about 20–100 ppm for the alginate.

It is also usually preferred that the liquid chitosan be of a high viscosity for poultry process waste streams possessing a positive or negative ionic charge, while high charge liquid chitosan is usually preferred for poultry waste streams possessing an amphoteric ionic charge. "High charge" refers to increased charge sites being present on the repeating chain unit on the chitosan molecule being made available for attachment. Typically, the higher the charge, the lower the viscosity. "High viscosity" as applied to the liquid chitosan denotes an average viscosity of at least 800 cps. The concentration range for the liquid chitosan is about 20–120 ppm for poultry processing waste streams possessing a positive: ionic charge, while negative and amphoteric ionic charged poultry waste streams have a typical concentration range for the liquid chitosan of about 80–160 ppm and 80–200 ppm respectively. Finally, it is preferred that the bentonite used in treating amphoteric poultry waste streams be fused bentonite and be in the concentration range of about 80–200 ppm although sodium bentonite, sodium bentonite fused to chitosan or calcium bentonite may also be used.

According to the inventive method, the resultant flocculent mass for each processing waste stream can be easily removed by a variety of flotation methods. However, other conventional mechanical recovery methods may be employed. Mechanical diffused or dissolved air flotation is the preferred method of solid recovery because the resulting floc obtained from this natural method for process waste streams may be non-rigid or weakly bonded and thus, more fragile. This floc may not remain flocculated with rapid mechanical action such as centrifuge processing. Moreover, the fatty acids, oils, grease, and proteins present in flocs obtained from these process waste streams can cause binding of the belts used in belt press dewatering operations, thus preventing the increased drying of the solids into an acceptable filter cake sludge for final recovery.

The recovered material of this process can be subsequently dried by any of a variety of drying methods. An advantage of the invention is that the resultant dried material may be granulated or pelletized and used as safe, non-toxic animal feed, fertilizer, or as landfill.

Another advantage of the invention is that the recovered end-product can also be used as a fuel source by mixing the dried granular or pelletized material with coal fines. By mixing the coal fines in various ratios with the flocculent end-product, followed by compacting, extrusion, and/or pelletization, fat-coal fuel pellets are created which may be used as an economical fuel source.

The use of all natural flocculants in the treatment of processing waste streams according to the invention provides a safe, cost effective and useful by-product material not obtainable with conventional processing waste treatments using synthetic flocculants. The recovered end-product of the invention is free from contaminants, such as polyacrylamides containing residual acrylamide, and therefore can be safely used as an animal feed supplement, fertilizer, or fuel source. The end-product is also biodegradable and safer to dispose making it an environmentally friendly product which can be used as landfill or the like.

The process of the invention also has the distinct advantage over prior methods of treating with synthetic flocculants in that it will assist manufacturing plants in finding a viable solution to not only meet NPDES discharge permits, but also provide a safer chemical treatment program that works well, if not better, than the non-approved polyacrylamide chemistries used by themselves or in conjunction with iron salts, alum, or polyaluminum chloride. In addition, the process of the invention provides recovered water discharge which is of high clarity and also free from toxic chemicals allowing easier compliance with local EPA discharge permits. Thus, unlike the prior methods, the invention provides for a safe, non-toxic, and biodegradable end-product which can be utilized commercially, making the process cost effective.

EXAMPLES

The following specific examples are provided in order to illustrate the practice of the invention, but are not to be construed to limit the scope of the invention. The natural flocculants used in the examples are commercially available and are set out in Table I as follows:

TABLE I

| TRADE NAME | FLOCCULANT | DESCRIPTION |
| --- | --- | --- |
| WOT Recovery Floc T | liquid chitosan (high viscosity) 800 cps | Poly (1,4-β-D-Glycopyranosamine) |
| WOT Poly B | bentonite fused to chitosan | Sodium montmorillonite and Poly (1,4-β-D-Glycopyranosamine) |
| WOT C-Floc | xanthan gum mixed with crushed limestone | ratio of xanthan gum to crushed limestone is approximately 95:10 |
| WOT-Al Floc | sodium alginate (high viscosity) 1% solution 800 cps | sodium salt of alginic acid |

The above material flocculants are commercially available from Water & Oil Technologies, Inc., Montgomery, Ill. 60538.

EXAMPLE 1

To 500 ml of raw waste water from a cattle processing waste stream 20 ppm of xanthan gum containing 5-10% crushed limestone (WOT-C Floc) was added with mild agitation. A homogenous mixture was formed containing a weak bonded floc after about 20-30 seconds. 40 ppm of a high viscosity liquid chitosan (WOT Recovery Floc T) was next added during mild agitation. A huge rigid floc was formed after 10-15 seconds. The resultant water flitrate had a slight red tint to clear transparency.

EXAMPLE 2

To 500 ml of raw waste water from a surimi processing waste stream 100 ppm of fused bentonite (WOT Poly B) was added during mild agitation. After 20-30 seconds a very small pin-size floc was formed. To further condition the surimi waste water, 400 ppm of high viscosity liquid chitosan (WOT Recovery Floc T) was next added during similar agitation and a homogenous mixture was formed containing a slightly larger pin-size floc after 10-15 seconds. Finally, 20 ppm of a high viscosity sodium alginate (WOT-Al Floc) was sequentially added to the conditioned homogenous mixture during agitation. A small firm tacky floc was formed after about 10-15 seconds. A tan tinted to transparent water flitrate was obtained which upon mechanical diffused or pressurized flotation provided a clear water filtrate.

EXAMPLE 3

To 500 ml of raw waste water obtained from a poultry processing waste stream having a negative net ionic charge, 80 ppm of high viscosity liquid chitosan (WOT Recovery Floc T) was added during rapid agitation. A homogenous mixture was formed containing small floc after 10-20 seconds. 80 ppm of high viscosity sodium alginate (WOT-Al Floc) was next added to the homogenous mixture and after 10-15 seconds of agitation a larger, rigid floc was formed. The resultant water filtrate was clear.

EXAMPLE 4

To 500 ml. of raw waste water obtained from a poultry processing waste stream having a positive net ionic charge, 80 ppm of high viscosity sodium alginate (WOT-Al Floc) was added during rapid agitation. After 10-15 seconds a homogenous mixture containing small floc was formed. Next 80 ppm of high viscosity liquid chitosan (WOT Recovery Floc T) was added to the homogenous mixture during rapid agitation. After 10–15 seconds a larger, rigid floc was formed. The resultant water filtrate was clear.

The foregoing description is given for clearness of understanding only, and no unnecessary limitations should be understood therefrom, as modifications within the scope of the invention will be apparent to those skilled in the art.

I claim:

1. A method of treating a process waste stream selected from the group consisting of cattle processing waste streams, fish processing waste streams, and poultry processing waste streams by the sequential addition of at least two natural flocculants, wherein at least one of the natural flocculants is a cationic liquid chitosan and another of the natural flocculants is an anionic natural flocculant, the method comprising the sequential steps of:

adding a first natural flocculant to said waste stream while agitating the mixture sufficiently so that a substantially homogenous mixture is formed; and, adding at least a second natural flocculant to said mixture while agitating sufficiently to form a flocculent mass of a density allowing subsequent recovery thereof, provided:

A) when said waste stream is a cattle processing waste stream, said anionic natural flocculant is xanthan gum, and said method comprises adding said xanthan gum to said waste stream followed by addition of liquid chitosan to said waste stream;

B) when said waste stream is a fish processing waste stream, said anionic natural flocculant is an alginate, and said method comprises the consecutive steps of adding to said waste stream a cationic bentonite natural flocculant, adding said liquid chitosan, and adding said alginate, with agitation during or following addition of each said natural flocculant; and C) when said waste stream is a poultry processing waste stream, said anionic flocculant is an alginate and is added to said waste stream before or after said liquid chitosan provided that:

1) when said poultry processing waste stream has a positive ionic charge said alginate is added first followed by said liquid chitosan, 2) when said poultry processing waste stream has a negative ionic charge said liquid chitosan is added first followed by said alginate, and 3) when said poultry processing waste stream has an amphoteric ionic charge, the method comprises the consecutive steps of adding to said waste stream a cationic bentonite natural flocculant, adding said liquid chitosan, and adding said alginate, with agitation during or following addition of each said natural flocculant.

2. The method of claim 1 wherein said liquid chitosan has a viscosity of at least about 800 cps measured by a Brookfield Viscometer at 25° C. and 30 rpm using a #3 spindle at 1 percent solution.

3. The method of claim 2 wherein said liquid chitosan has a viscosity in the range of about 800 to about 2000 cps measured by a Brookfield Viscometer at 25° C. and 30 rpm using a #3 spindle at 1 percent solution inclusive.

4. The method of claim 1 wherein said alginate is selected from the group consisting of the *Phaeopohyceae* alginates.

5. The method of claim 1 wherein said alginate is sodium alginate.

6. The method of claim 1 wherein the viscosity of said alginate is at least about 800 cps measured by a Brookfield Viscometer at 25° C. and 30 rpm, using a #3 spindle at 1 percent solution.

7. The method of claim 1 wherein said waste stream is a cattle processing waste stream and said xanthan gum contains crushed limestone.

8. The method of claim 7 wherein said limestone-containing xanthan gum contains between about 90–95 weight percent xanthan gum and about 5–10 weight percent limestone.

9. The method of claim 7 wherein said limestone-containing xanthan gum is added to said waste stream at a concentration of about 20 ppm to about 50 ppm and said chitosan is added to said waste stream at a concentration of about 20 ppm to about 80 ppm.

10. The method of claim 1 wherein said waste stream is a cattle processing waste stream and the viscosity of said liquid chitosan is at least about 800 cps measured by a Brookfield Viscometer at 25° C. and 30 rpm using a #3 spindle at 1 percent solution.

11. The method of claim 10 wherein said liquid chitosan has a viscosity in the range of about 800 cps to about 2000 cps measured by a Brookfield Viscometer at 25° C. and 30 rpm using a #3 spindle at 1% solution.

12. The method of claim 1 wherein said waste stream is a fish processing waste stream and said bentonite is selected from bentonite fused to chitosan, said alginate is sodium alginate and said chitosan has a high viscosity of at least about 800 cps measured by a Brookfield Viscometer at 25° C. and 30 rpm using a #3 spindle at 1 percent solution.

13. The method of claim 12 wherein said sodium alginate has a viscosity of at least about 800 cps measured by a Brookfield Viscometer at 25° C. and 30 rpm, using a #3 spindle at 1 percent solution.

14. The method of claim 12 wherein said fused bentonite comprises between about 98–99 weight percent bentonite and about 1 weight percent chitosan.

15. The method of claim 12 wherein the respective concentrations of said bentonite, said alginate and said chitosan in said waste stream are in the range of about 180 ppm to about 400 ppm for said bentonite, about 20 ppm to about 40 ppm for said alginate and about 350 ppm to 500 ppm for said chitosan.

16. The method of claim 12 wherein said fish processing stream is a surimi waste stream.

17. The method of claim 1 wherein said waste stream is a poultry processing waste stream, and said alginate is sodium alginate, and said bentonite is bentonite fused to chitosan.

18. The method of claim 1 wherein said waste stream is a poultry processing waste stream and the respective concentrations of said alginate, said chitosan, and said bentonite in said waste stream are about 20 ppm to about 160 ppm for said alginate, about 20 ppm to about 200 ppm for said chitosan and about 80–200 ppm for said bentonite.

19. The method of claim 18 wherein said alginate has a high viscosity of at least about 800 cps measured by a Brookfield Viscometer at 25° C. and 30 rpm, using a #3 spindle at 1 percent solution.

20. The method of claim 18 wherein said chitosan has a high viscosity of at least about 800 cps measured by a Brookfield Viscometer at 25° C. and 30 rpm using a #3 spindle at 1 percent solution.

* * * * *

UNITED STATES PATENT AND TRADEMARK OFFICE
CERTIFICATE OF CORRECTION

PATENT NO. : 5,433,865

DATED : July 18, 1995

INVENTOR(S) : Edward L. Laurent

It is certified that error appears in the above-identified patent and that said Letters Patent is hereby corrected as shown below:

Column 1, line 40, "flow" should be --floc--.

Column 3, line 22, "artionic" should be --anionic--.

Column 3, line 32, "artionic" should be --anionic--.

Column 3, line 58, "artionic" should be --anionic--.

Column 8, line 60, "positive:" should be --positive--.

Signed and Sealed this

Fourteenth Day of November, 1995

*Attest:*

BRUCE LEHMAN

*Attesting Officer*  *Commissioner of Patents and Trademarks*